United States Patent Office 3,372,489
Patented Mar. 12, 1968

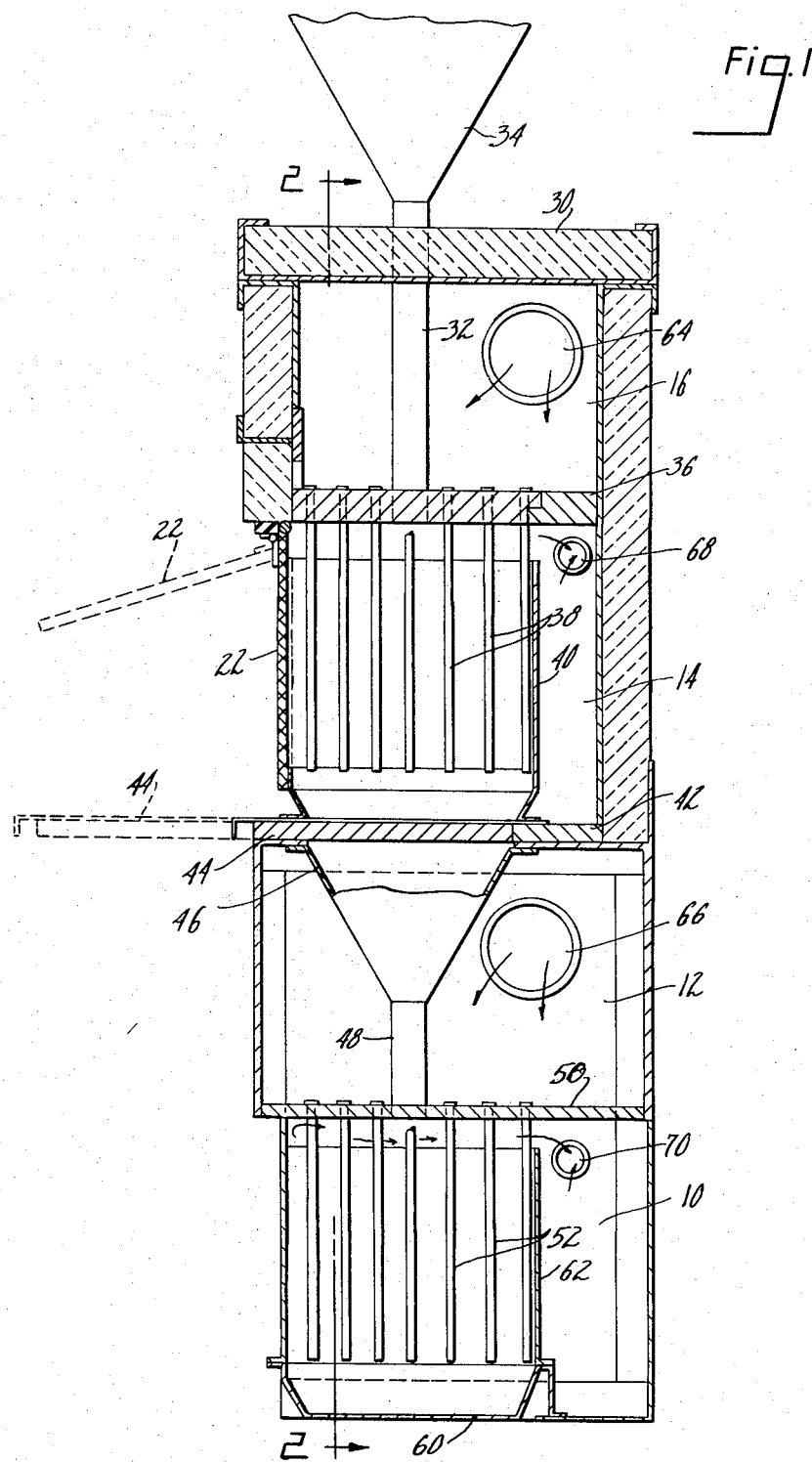

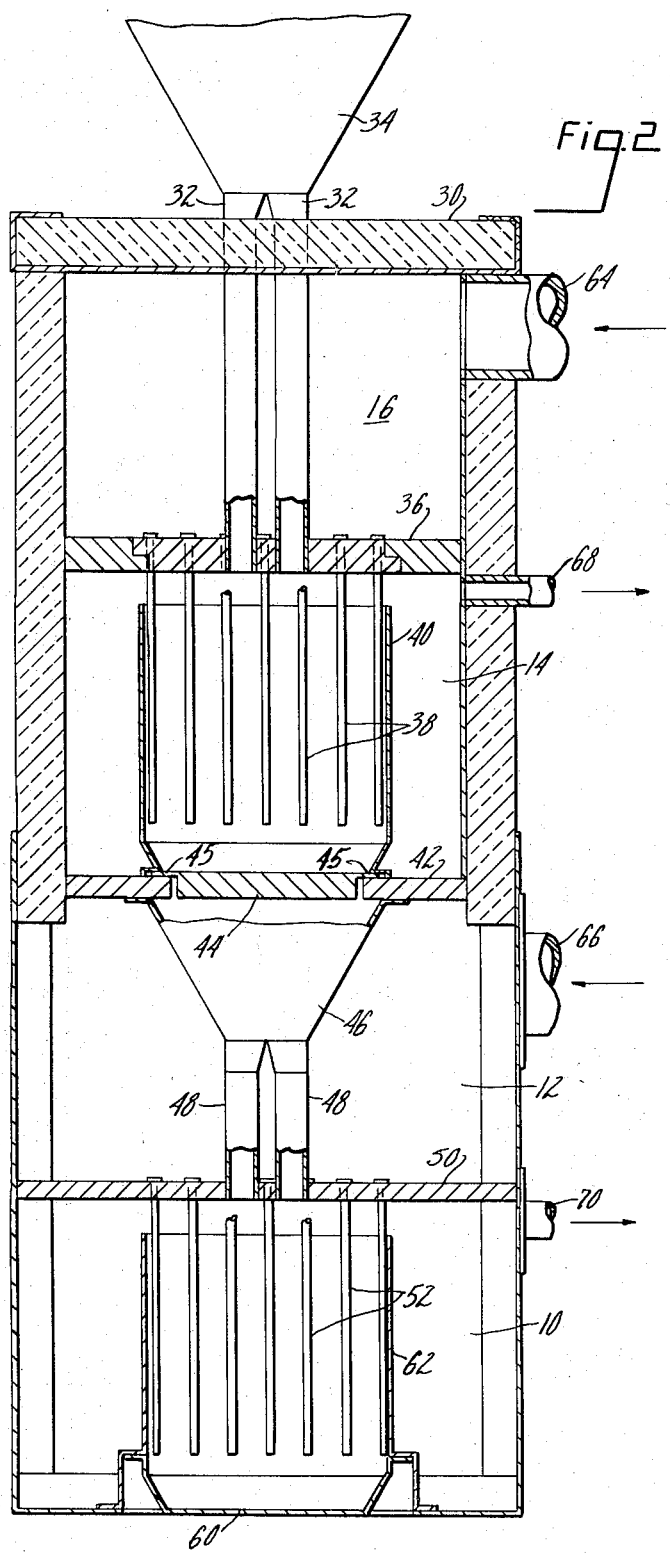

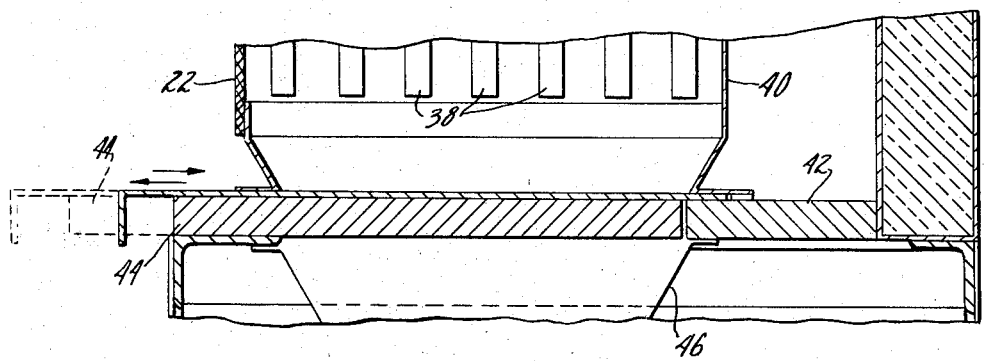
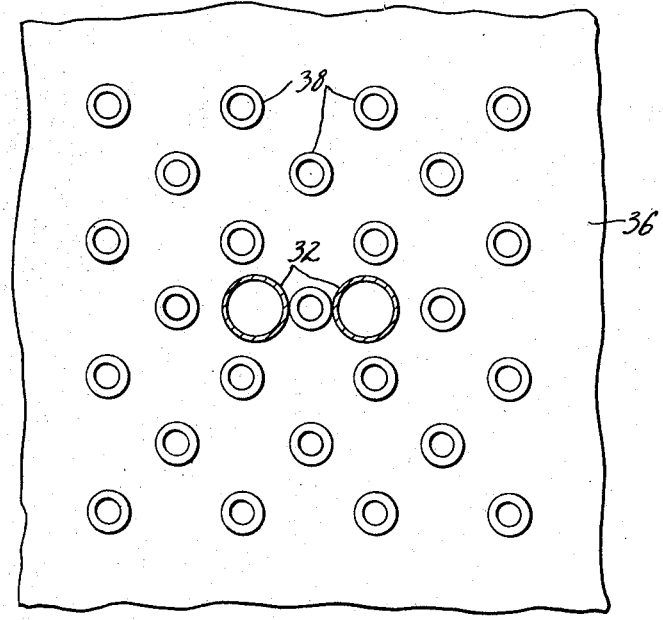

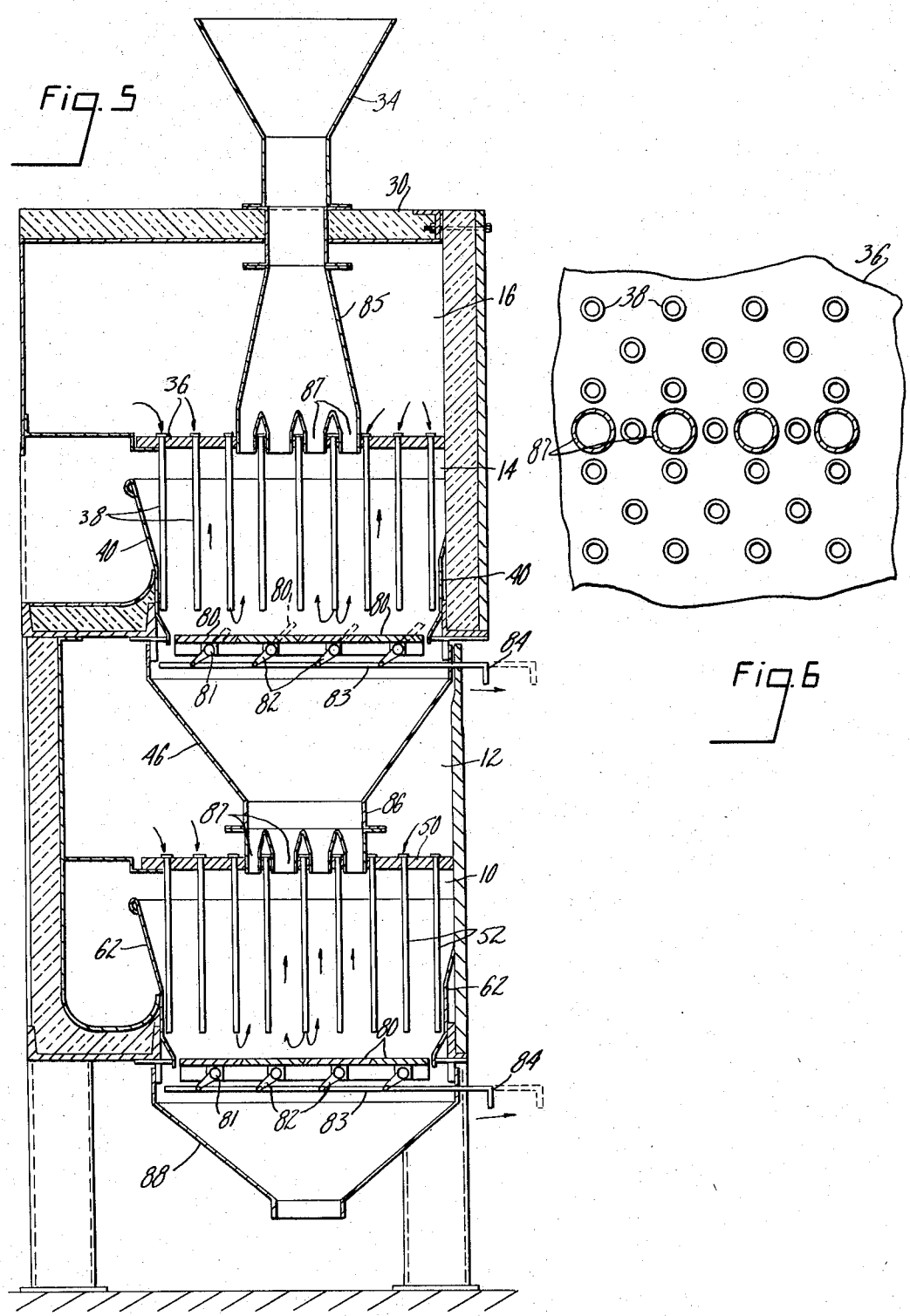

3,372,489
HEAT TRANSFER APPARATUS USING FLUIDIZA-
TION IN BOTH SINGLE BED AND PLURAL BED
FORMS
Ernest Charles Brown, 19 Ledgewood Drive,
Danvers, Mass. 01923
Continuation of application Ser. No. 450,428, Apr. 23,
1965. This application Dec. 29, 1966, Ser. No. 613,701
10 Claims. (Cl. 34—57)

ABSTRACT OF THE DISCLOSURE

Heat transfer apparatus using fluidization comprising top and side walls defining an enclosure and a series of spaced horizontal partitions forming with the side and top walls, in vertically upward succession, a lower chamber, an upper treating chamber, and a superposed plenum. The partition forming the floor of the upper treating chamber is movable to form an opening leading downwardly into the lower chamber. A plurality of parallel tubes are provided for introducing air at high velocity from the plenum in a downward direction into the upper chamber.

---

This application is a continuation of my co-pending application, Ser. No. 450,428, filed Apr. 23, 1965, now abandoned.

This invention relates to the gaseous treatment of particles, and more particularly to apparatus for drying or roasting particulate material, such as particulate foodstuffs in the form of coffee or cocoa beans and the like.

In many heating processes, it is a prime objective of the processor to secure uniformity of application of heat so that each individual particle has been treated as far as possible to the same exact extent as every other particle. When the individual particles have substantially the same densities and surface areas, the apparatus manufacturer therefore seeks to provide apparatus which will expose the entire surface of each particle to the same weight of uniform temperature gas over an identical period of time.

Because contact of the particles with each other or with a supporting surface is one factor which prevents full achievement of this aim, proposals have been made to utilize fluidization of particle beds by blowing hot gases up through a batch of the particles. However, problems arise when one attempts to remove the particles from the upwardly flowing gas fluidizing stream. In a stationary roaster, it is difficult, even after defluidizing the bed by shutting off the air stream, to remove any substantial quantity of the charge simultaneously, and practically impossible to so remove the charge without defluidizing it.

To simplify removal problems, it has been suggested in U.S. Patent No. 3,149,976 that the roaster be formed in a series of vertical chambers so that the charge may be finally dropped through an air lock and rotary valve at the bottom of the roasting apparatus below the inlet of hot air into the chamber. With such an arrangement, it is impossible to have the air stream operating at a fluidizing velocity, otherwise the coffee beans could not be discharged, but would remain suspended in the air stream. Accordingly, in such devices the gas velocity is held below a fluidization level.

In accordance with the present invention, the principles of fluidization are preserved while still permitting the particles being treated to be readily passed downwardly through and discharged out of the bottom of the apparatus without reducing the gas velocity. This is accomplished by utilizing overhead gaseous jets impinging on and diverted reversely upwardly from a solid floor to cause fluidization, but the floor is removable or openable. The result is that when the floor is opened, the gaseous jets not only do not hinder the particles from dropping to a lower level, but, in fact, blast them to a lower level, forcibly ejecting them from the upper level causing a very rapid transition from one level to the next lower level.

A typical embodiment of the invention is shown in the accompanying drawings wherein:

FIG. 1 is a cross-sectional view of one embodiment of the invention;

FIG. 2 is a cross-sectional view taken along the line 2—2 of FIG. 1;

FIG. 3 is an enlarged cross-sectional detail of certain portions of the apparatus shown in FIGS. 1 and 2;

FIG. 4 is a fragmentary enlarged plan view of one of the partitions shown in FIGS. 1 and 2;

FIG. 5 is a cross-sectional view of a modified form of the invention; and

FIG. 6 is a fragmentary enlarged plan view of one of the partitions shown in FIG. 5.

In the embodiment shown in FIG. 1, the apparatus includes a multi-chamber casing having side and top walls and vertically spaced horizontal partitions dividing the casing into, in succession from bottom to top, a lower treating chamber 10, a superposed plenum 12, a second treating chamber 14, and a second superposed plenum 16.

The walls surrounding the two upper chambers 14 and 16 may be suitably insulated and one portion 22 of one vertical side wall may be in the form of a door hinged so as to be movable into the dotted line position shown in FIG. 1 to provide access to the upper treating chamber 14.

Extending through the insulated top wall 30 is a pair of ducts 32 communicating at their tops with a hopper 34 and extending downwardly through the floor 36 of plenum 16 into the upper treating chamber 14.

Suspended through the floor 36 of the upper plenum 16 are a series of parallel tubes 38 which extend downwardly within an internal open-top lining 40 towards the floor 42 of the upper treating chamber 14. As shown in FIG. 4, the pattern of the tubes is such as to accommodate the ducts 32 therebetween.

It will be noted that the lower marginal portions of the lining 40 are tapered inwardly on all sides to direct material passing from the hopper 34 down through the ducts 32 into the upper treating chamber towards a removable central portion 44 that has flanges 46 which ride on opposed fixed portions of the floor 42, as shown, permitting the removable floor 44 to be slid out to the dotted position shown in FIG. 1.

A funnel 46 is attached to the underneath surface of the fixed floor portion 42 and leads again into a pair of ducts 48 which extend down through the plenum 12 and through the floor 50 of the plenum into the lower treating chamber 10.

The lower treating chamber 10 also has a series of tubes 52 suspended through the plenum floor 50 down towards a removable pan 60 placed beneath an open-top liner 62 enclosing the tubes 52.

The upper plenum 16 is provided with an inlet 64 and the lower plenum 12 is provided with an inlet 66 forming conduits for introducing air separately into the two plenums. The upper treating chamber 14 is provided with an exhaust outlet 68 and the bottom treating chamber with an exhaust outlet 70 forming conduits for exhausting air separately from the two chambers.

Particulate material therefore may be metered into the hopper 34 or from the hopper 34 into the ducts 32 and will flow freely by gravity down into the treating chamber 14 where they are met by a blast of hot air emanating from the jet tubes 38 by reason of hot air pressure introduced into the plenum 16 through inlet 64 and maintained in a fluidized agitated state until the removable floor portion 44 is slid out permitting the particles to be blasted down by the jets from tubes 38 through the funnel 46 and duct 48 into the lower treating chamber 10 where they will again be fluidized by the jets emanating from the tubes 52 for such periods of time as the pan 60 remains beneath the tubes. The floor 44 is, of course, re-positioned immediately after emptying the upper treating chamber 14 so that the upper treating chamber 14 can be re-charged with material while the previous batch of material is being treated in the lower chamber 10.

As can be seen by reason of this operation, a very rapid transit of a batch from the upper treating chamber 14 may occur so that particles, such as coffee beans, can be quickly removed from roasting heat imparted by hot air circulating through the upper chamber and passed into lower chamber 10 through which cold or cooler air is being circulated. Improved uniformity in roasting time for each particle is thus achieved.

FIGS. 5 and 6 show a modification wherein, instead of having a sliding floor in the upper treating chamber and a removable pan below the lower treating chamber, each of the treating chambers has a louvered floor.

Thus, the apparatus, though of different dimensions than that shown in FIGS. 1 and 2, has a corresponding lower treating chamber 10 superimposed by a lower plenum 12, an upper treating chamber 14 and an upper plenum 16.

The tubes 38 in the upper treating chamber and the tubes 52 in the lower treating chamber are similar to those in FIGS. 1 and 2 though different in number and are each surrounded, as in FIGS. 1 and 2, by open-top liners 40 and 62, respectively, being of somewhat different shape than those shown in FIGS. 1 and 2.

The floor of the upper treating chamber 14 is formed of a series of plates 80, each centrally pivoted on shafts 81 which are connected by links to an activating rod 83 terminating in a handle 84 which may be utilized to move the louvers 80 from a position lying in a plane forming an air tight floor to the dotted line tilted position shown in FIG. 5 permitting the particles to fall and be blown off the louvers 80 down into the funnel 46.

The floor of the lower treating chamber 10 in FIG. 5 is similar in all respects to the upper chamber floor, and hence, the parts thereof have been given the same reference numerals as those for the upper treating chamber 14.

The embodiment of FIG. 5 also differs from that of FIGS. 1 and 2 in that the ducts 85 and 86 leading from the upper hopper 34 and from the funnel 46, respectively, are initially single instead of being pairs, but divide into four in-row outlets 87 to pierce the floors of the plenums between the jet tubes 38 and 52, as shown in FIG. 6 for the upper plenum floor.

A further funnel 88 is provided below the lower louver floor to direct material into any convenient removing device or conveyor positioned beneath the funnel 88. A suitable hot-air inlet into the upper plenum 15 and a cold-air inlet in the lower plenum 12, as well as exhaust outlets from the lower treating chamber 10 and the upper treating chamber 14 are provided (not shown) as in the embodiments of FIGS. 1 and 2.

It will be understood that the means for operating the floors to open them can be automated and timed in succession to allow automatic batch operation synchronized with the admission of batches through the upper hopper 34.

What is claimed is:

1. Heat transfer apparatus comprising side and top walls forming an enclosure, a series of spaced horizontal closed partitions forming with said walls in vertical upward succession, a lower chamber, an upper treating chamber and a superposed plenum, duct means extending through the top wall, plenum and plenum floor for introducing particulate material into said upper treating chamber, and conduit means for introducing air through said plenum in a downward direction into said upper chamber and for exhausting air from said upper chamber, the partition forming the floor of said upper chamber being movable to form at least one opening therethrough leading downwardly out of said upper treating chamber into said lower chamber, and said conduit means including a set of parallel tubes extending through, and suspended downwardly from, the partitions defining the bottom of said plenum towards the partition forming the floor of said upper chamber to direct air against the floor of said chamber in a series of high-velocity jets.

2. Heat transfer apparatus comprising side and top walls forming an enclosure, a series of spaced horizontal closed partitions forming with said walls, in vertical upward succession, a lower chamber, an upper treating chamber, and a superposed plenum, a series of parallel tubes extending through the partition forming the floor of said plenum downwardly towards the partition forming the floor of the underlying treating chamber to direct air from said plenum against said floors in a series of high-velocity jets, means for opening the partition forming the floor of said upper chamber, duct means for introducing particulate material through the top of said enclosure through said plenum and into said upper treating chamber between said upper chamber tubes, and conduit means for introducing air into said plenum and for exhausting air from said upper chamber.

3. Apparatus as claimed in claim 2, wherein said closed partition forming the floor of said upper chamber comprises a series of pivoted louvers and said floor opening means includes linkage for simultaneously pivoting said louvers from a closed position lying in a plane to open tilted positions.

4. Heat transfer apparatus comprising side and top walls forming an enclosure, a series of spaced horizontal closed partitions forming with said walls in vertical upward succession, a lower treating chamber, a superposed lower plenum, an upper treating chamber and a superposed upper plenum, the partition forming the floor of said upper chamber being movable to form at least one opening therethrough leading downwardly out of said upper treating chamber, conduit means extending below said opening down through said lower plenum for guiding solid particulate material dropped through said opening into said lower chamber, conduit means for introducing air through said upper plenum into said upper chamber and for exhausting air from said upper chamber, and conduit means for introducing air through said lower plenum into said lower chamber and for exhausting air from said lower plenum.

5. Apparatus as claimed in claim 4, wherein said conduit means includes a set of tubes extending through and suspended downwardly from each of the partitions forming the floors of said plenums towards the partitions forming the floors of said treating chambers to direct air against the floors of said chambers in a series of high-velocity jets.

6. Apparatus as claimed in claim 5, having means for opening the floor of the upper treating chamber, and duct means for directing material passing through the opened floor of said upper treating chamber through said lower plenum into said lower chamber.

7. Apparatus as claimed in claim 5, having means for opening the floors of both treating chambers, and duct means for directing material passing through the opened floor of said upper treating chamber through said lower plenum into said lower treating chamber.

8. Heat transfer apparatus comprising side and top walls forming an enclosure, a series of spaced horizontal closed partitions forming with said walls, in vertical upward succession, a lower treating chamber, a superposed lower plenum, an upper treating chamber, and a superposed upper plenum, a series of parallel tubes extending through the partition forming the floor of each of said plenums downwardly towards the partition forming the floor of the underlying treating chamber to direct air from said plenums against said floors in a series of high-velocity jets, means for opening the partition forming the floor of said upper chamber, duct means for introducing particulate material through the top of said enclosure through said upper plenum and into said upper treating chamber between said upper chamber tubes, duct means for conducting material passed through the opened floor of said upper treating chamber through said lower plenum into said lower treating chamber between said lower treating chamber tubes, conduit means for introducing air into said upper plenum and for exhausting air from said upper chamber and conduit means for introducing air into said lower plenum and for exhausting air from said lower chamber.

9. Apparatus as claimed in claim 8, having, in addition, means for opening the partition forming the floor of said lower chamber to allow particulate material to pass through the opened floor of said lower chamber.

10. Apparatus as claimed in claim 8, wherein the closed partitions forming the floors of both said upper and lower chambers include a series of pivoted louvers, and each said floor opening means includes linkage for simultaneously pivoting the louvers in each floor from a closed position lying in a plane to open tilted positions.

References Cited
UNITED STATES PATENTS

| | | | |
|---|---|---|---|
| 1,883,218 | 10/1932 | Wohlenberg | 34—57 |
| 3,197,328 | 7/1965 | Jung et al. | 263—21 |
| 3,263,339 | 8/1966 | Brown et al. | 34—57 |

FREDERICK L. MATTESON, JR., *Primary Examiner.*

J. J. CAMBY, *Assistant Examiner.*